Patented Nov. 22, 1932

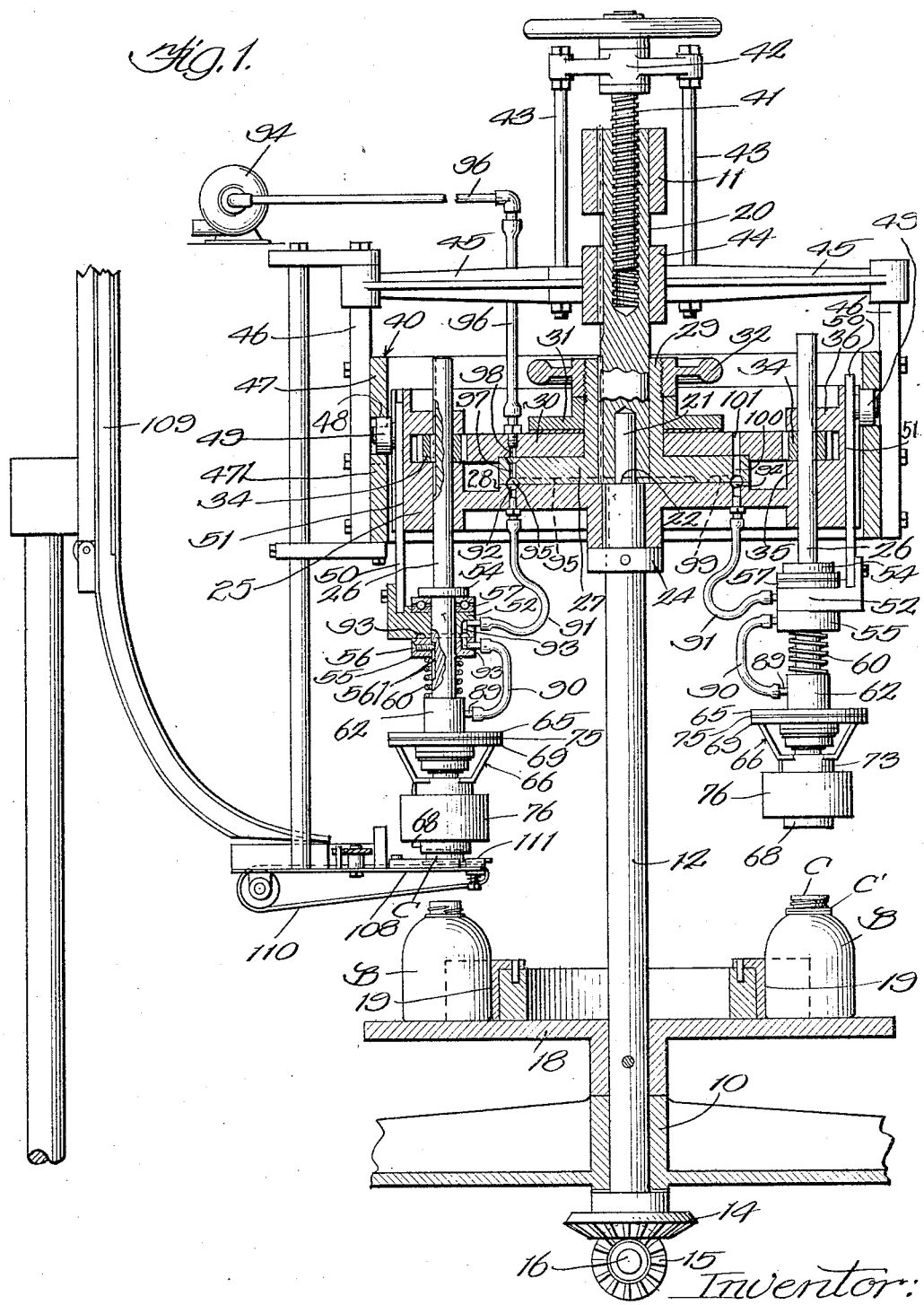

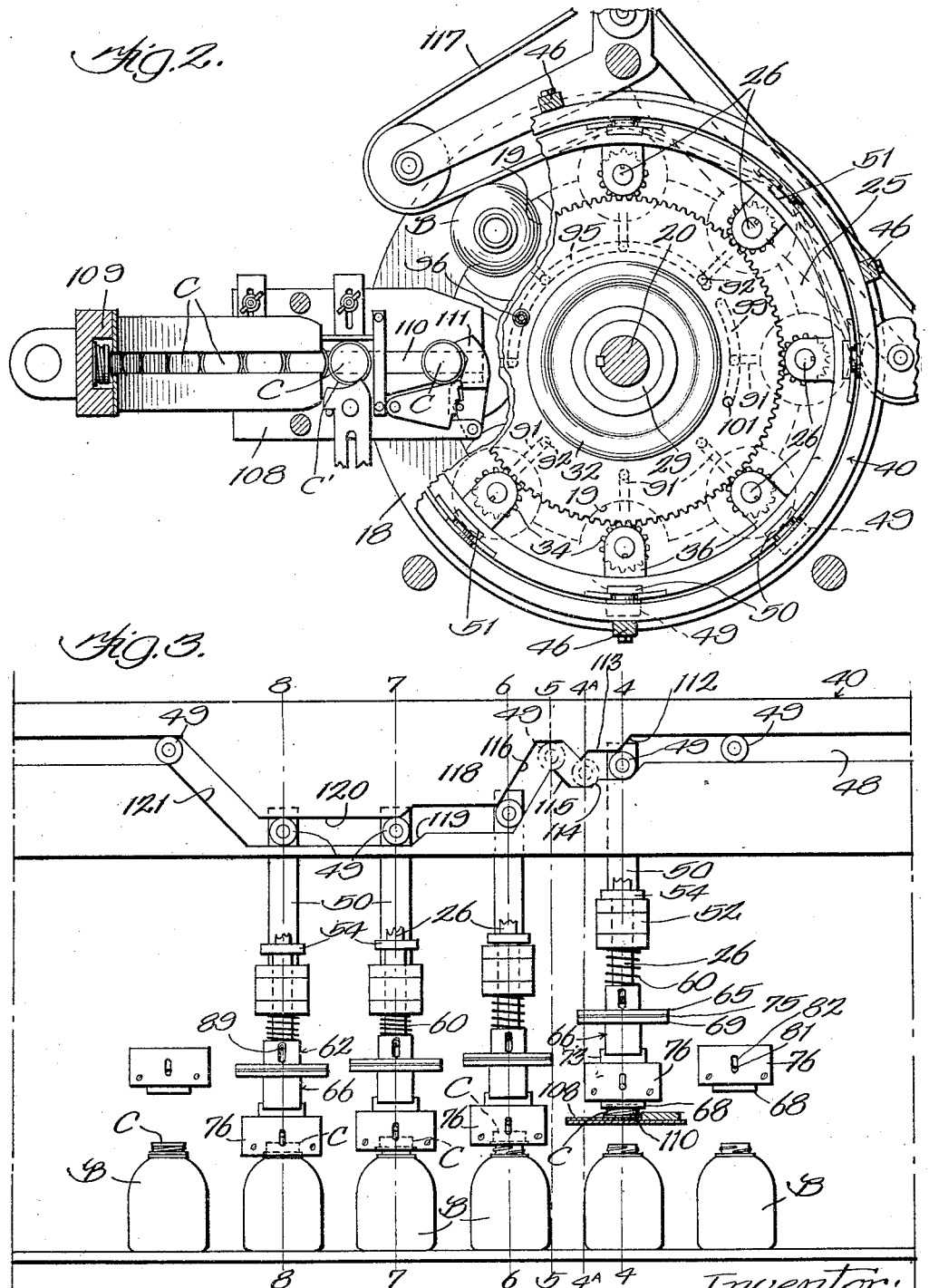

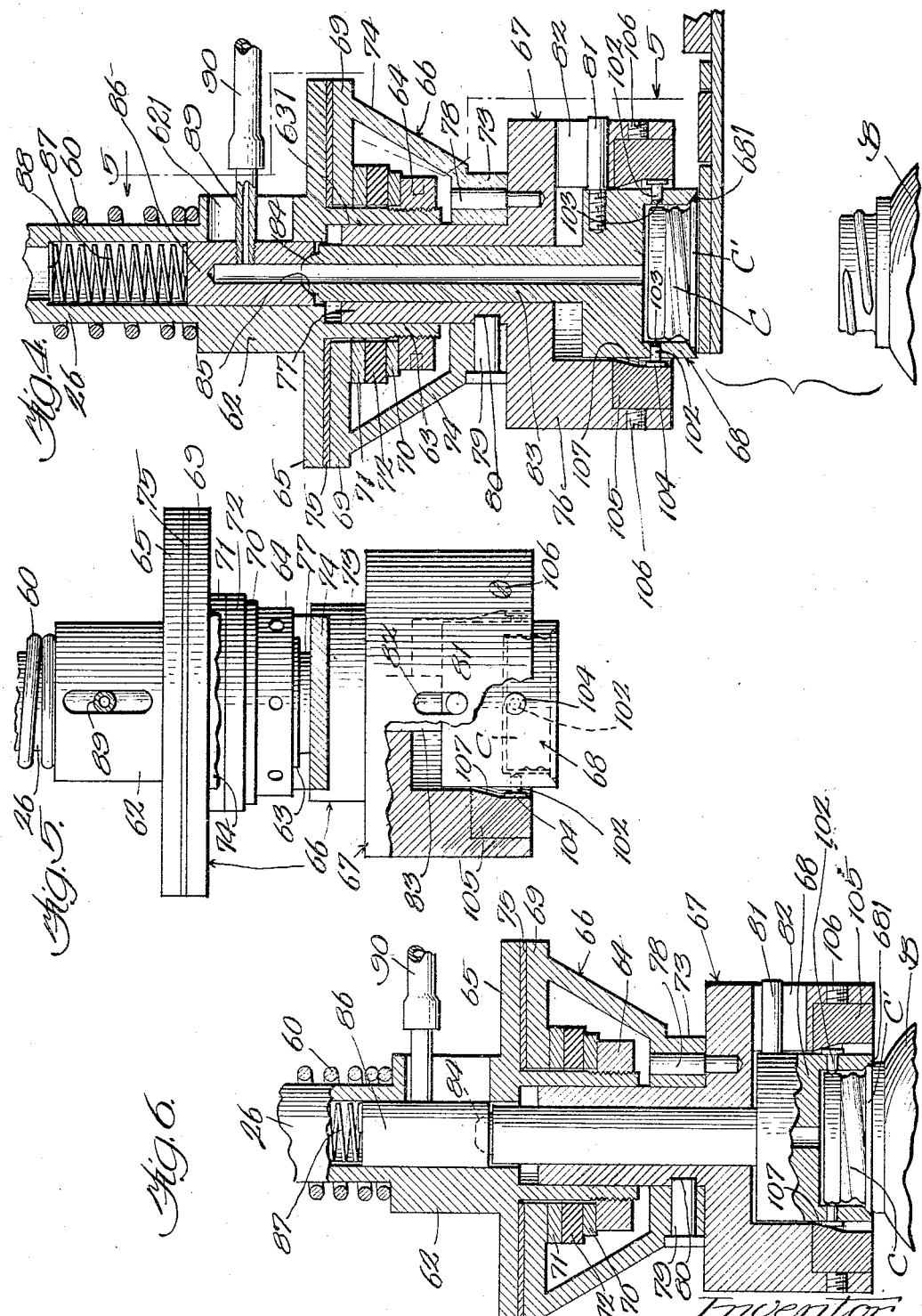

1,888,470

UNITED STATES PATENT OFFICE

ARTHUR I. RISSER, OF CHICAGO, ILLINOIS

SCREW CAP APPLYING MACHINE

Application filed August 17, 1931. Serial No. 557,649.

This invention relates to screw cap applying machines, such as shown in my application Serial No. 354,013, filed April 10, 1929, and Patent No. 1,748,961, dated March 4, 1930; and this invention more particularly pertains to such a machine for applying screw caps which have an outwardly extended flange at their open ends, such as screw caps for fruit jars.

One of the objects of the invention is to provide an improved capping head which will positively position and maintain a screw cap in substantially coaxial alignment with the threaded neck of the receptacle being capped, prior to and during the capping operation, in order to prevent the cap from becoming canted and jammed on the threads of the bottle.

Another object of the invention is to provide such a capping head which cooperates with the flange portion of the cap in positioning same.

Other objects and advantages will become apparent in the following description, with reference to the accompanying drawings, in which:—

Fig. 1 is a sectional view of the general cap applying mechanism of a turret type of machine, similar to the machine more fully shown and described in said application, this machine being chosen for the purpose of illustrating this invention; and it is to be understood that the improvements disclosed and pointed out herein may be used in other types of machines.

Fig. 2 is a plan view of parts shown in Fig. 1, with parts broken away, parts omitted and parts shown in section.

Fig. 3 is a diagram for illustrating the operation of the machine.

Fig. 4 is an enlarged cross-sectional view of the capping head, the head being shown in position for picking up the screw cap C, corresponding to the position 4A in Fig. 3.

Fig. 5 is a sectional view of the capping head taken on the line 5—5 of Fig. 4, with parts broken away.

Fig. 6 is a view similar to Fig. 4 with parts in changed position, parts in full and parts omitted, and showing the capping head in the position where the cap is fully applied to the bottle B, as at position 8 in Fig. 3.

The spider hub 10 and the hub of a cross yoke 11 are fixedly supported in the frame of the machine, as fully shown and described in said application, wherein the corresponding parts are numbered 37 and 41, respectively. The hubs 10 and 11 are in vertical alignment, and in the hub 10 is rotatably mounted the turret shaft 12, which is constantly rotated by a suitable application of power through the bevel gear 14 pinned on the lower end of the shaft 12, which meshes with a bevel pinion 15 fixed on a drive shaft 16. The circular turret bottle support table 18 is pinned to the shaft 12 and rests on the stationary hub 10, thereby supporting the shaft vertically; and to the table 18 are fitted pocketed members 19 for holding the bottles B.

In the fixed hub 11 is keyed a non-rotating support shaft 20, which is bored out to receive the reduced upper end portion 21 of the shaft 12 and is supported on the shoulder 22, formed on the shaft 12.

Keyed on the upper end of the shaft 12, below the reduced portion 21, and supported on a collar 24, pinned on the shaft 12, is a spindle support ring 25 in which the capping head spindles 26 are rotatably and slidably mounted.

Keyed to the shaft 20, against rotation, is a flanged support member 27, which rests on a flat circular seat 28 provided at the center of the member 25, and which has a threaded sleeve 29 extending up around the stationary shaft 20. Resting on the upper surface of the flanged portion of the member 27 is a spur gear 30 which is frictionally held from rotation by being pressed against the member 27 by the flanged ring 31 and hand wheel follower 32 which threads onto the sleeve 29. Then, as the member 25 is turned with the shaft 12, the spindles 26 are rotated by the pinions 34, which mesh with the stationary central gear 30. The pinions 34 are slidably keyed to the spindles and are held between lugs 35 and 36 formed in the member 25.

For moving the constantly rotating spindles up and down and positioning them to pick up, carry, start the threading, and screw the cap down on the bottles B, retained in the pockets 19, as shown diagrammatically in Fig. 3, a cam 40 encircles the spindle support ring 25, and is adjustably supported, for accommodating bottles of different heights, by a screw 41 which threads into the upper end of the shaft 20. The arms of the yoke 42, rotatably mounted on the screw 41, are connected by depending rods 43 to a spider 44, slidably keyed to the shaft 20. To the ends of the radially extending arms 45 of the spider 44, are secured depending bars 46 which are bolted to the upper and lower rings 47 and 471 of the cam 40, the rings being spaced to form the cam groove 48, in which ride the rollers 49.

The rollers 49 are journaled on bars 50 which are slidably guided in vertical grooves 51 in the outer periphery of the ring member 25, and to the lower end of the bars 50 are secured collars 52 which loosely embrace the spindles between a flange 54, integrally formed on the spindle, and a collar 55, slidable on the spindle and connected thereto for rotation by a set screw 56, which engages in a slot 561 in the spindle 26. A ball thrust bearing 57 is inserted between the collar 52 and the flange 54 to reduce friction from the pressure of the spring 60 which is compressed between the collar 55 and the shoulder of an enlarged portion 62 of the spindle. The spindle is hollow, and the extreme lower end 63 is threaded to receive the clamping nut 64, and integrally formed near the lower end of the spindle is a circular flange 65.

The capping head of this invention comprises, generally, head support members 66, 67, and a chuck member or vacuum cup 68, which are mounted on the lower end of each spindle 26, as will be described. The head support member 66 has an annular flange 69 which is pressed into frictional engagement with the under side of the spindle flange 65 by the nut 64, threaded on the lower end 63 of the spindle, and the superimposed friction washers 70, 72 and 71. A short hub or sleeve portion 73 of the member 66 is spaced below the nut 64 and integrally connected to the flange 65 by the arms 74. A ring 75, of friction material, is interposed between the flanges 65 and 69 so that the head support member 66 is frictionally connected to the spindle for rotation.

The head support member 67 comprises a hollow body or holder 76 having a hollow stem 77 which projects through the hub or sleeve portion 73 of the support member 66, and is received within the enlarged bore 631 in the end portion 63 of the spindle. The members 66 and 67 are rigidly connected to function as one piece by a vertically disposed pin 78 and the radial pin 79, as best shown in Fig. 4. The pin 79 is fixed in the hub portion 78 and extends into a notch 80 in the side of the stem 77 of the holder 76.

The chuck or vacuum cup 68 is slidably contained within the holder 76 so as to have a limited amount of axial movement with respect to the spindle. The vacuum cup is connected to the member 67 for rotation by means of a radial pin 81, which projects from the cup and engages in a vertical slot 82 provided in the wall of the holder 76. Extending upwardly from the vacuum cup 68 and integrally formed therewith is a stem or hollow tube 83 which is slidably contained within the stem 77 of the head support member 67.

For creating a vacuum in the cup 68 to pick up and retain a bottle cap therein when the cup is placed over a cap, as shown in Fig. 4, provisions are made as follows: On the upper end of the tube 83 is provided a spherical nipple 34 which enters a conical recess 85 provided in the lower end of a short hollow plunger 86. The plunger 86 is loosely contained in the bore of the spindle and is pressed into contact with the stem 83 by the spring 87 which is seated on the shoulder 88 formed on said bore. The spring thereby urges the vacuum cup downward so that normally it projects slightly from the end of the holder 76, this downward movement being stopped by the pin 81, secured to the cup, contacting with the bottom of the slot 82.

In the side of the plunger 86 is threaded a pipe fitting 89 which projects loosely through a slot 621 provided in the spindle portion 62. The pipe fitting is connected by flexible pipes 90 and 91 to a port 92 in the upper surface of the seat 28 of the member 25, the pipes being connected so that the lower pipe 90 can rotate with the spindle through suitable cooperating passages 93 in the relatively movable collars 55 and 52.

As the spindle support member 25 rotates, the port 92 therein is brought into and out of communication with a source of vacuum of pump 94 for producing a vacuum in the cup at the desired time by means of a segmental concentric groove 95 provided in the lower surface of the normally stationary member 27, the groove 95 being in constant communication with the pump line 96 of the pump through the cooperating passages 97 and 98 formed, respectively, in the member 27 and the gear 30. After the port 92 is moved out of communication with the groove 95 in the rotation of the member 25, it is brought into registration with a short arcuate groove 99, formed in the lower surface of the member 27, which groove is open to the atmosphere through the aligned passages 100 and 101 formed in the member 27 and the gear 30, respectively, and the vacuum in the cup is thereby broken.

The vacuum cup 68 is provided with clamping means, described below, for holding a cap received within the cup against rotation. This means is only effective during the cap applying operation, and includes radially disposed pins 102 which are slidably mounted in the wall of the cup. The inner ends of the pins 102 have conical points 103 on the inner ends for engaging the caps, and have flat heads 104, on the outer ends, which limit the inward movement.

For controlling the action of the pins so that they are released for the insertion and withdrawal of the cap, and moved into positive engagement with the cap when the same is in position and is being screwed on to the cap, a ring shaped cam 105, fixedly secured in the lower end of the holder 67, is provided, the cam ring being held in position by set screws 106, threaded through the wall of the holder.

The upper portion 107, of the bore of the ring, tapers inwardly so as to force the pins in against the upper end of the cap when the head is in the condition as shown in Fig. 6, with the cap in contact with the bottle.

To review briefly the construction and general arrangement of the machine more fully described in said application, as the table 18 and the spindles, in axial alignment with bottle pockets 19, are rotating about the shaft 12, the bottles B are placed in the pockets at the front of the machine, as viewed in Fig. 2. The bottles are carried around counterclockwise, and removed fully capped when they are brought back around to the front.

The bottles pass under a fixedly mounted shelf 108 to which the caps are supplied from a magazine 109, the caps being carried out from the end of the magazine by a traveling belt 110 which moves the cap up against a stop 111, mounted on the shelf, and in alignment with the spindles moving thereover. The spindles are held in raised position at the front of the machine by the rollers 49 riding in the higher portion of the cam groove 48. As the spindle moves over the shelf, it is lowered by the cam depression 112 to the cam dwell 113, then lowered slightly further by the dwell 114, as the spindle moves beyond the belt and over the surface of the shelf 108 at the side of the belt, during which time the cap is picked up. Then the spindle is lifted, by the rise 115, and lowered, by the depression 116, to the lower position 118 in close relation to the bottle, during the thread-finding operation. At the cam depression 119 the spindle is fully lowered to the screwing-down position, with the cam roller in the lowermost dwell 120. Then the spindle is raised by the cam rise 121 to the uppermost position as it is moved around to the front of the machine.

The vacuum is applied as the spindle is over the feed belt 110, and released at the end of the lowermost dwell 120, and at the rear of the machine is provided a belt 117 which is suitably guided to contact with the sides of the bottles and prevent them from turning while the spindles are in cap-applying relation therewith.

Thus, in the new arrangement shown herein, at the front of the machine, with the spindles raised, the end of the vacuum cup, or chuck member, 68 is projecting from the holder 67 and the pins 102 are below the cam surface 107. Then as the spindle is moved around, on the axis of the shaft 20, over the belt 110, position 4, Fig. 3, the spindle is lowered so that the cup 68 sits lightly over the awaiting cap on the shelf 108. The vacuum is then applied to draw the cap up into the cup so that the lower edge 681, preferably conical, is in contact with the flange C' around the lower edge of the cap C. In case the pins stick or are not pressed out by the cap, and the cap is not immediately drawn up by the vacuum, the spindle is lowered further as it moves over the surface of the shelf, at the side of the belt, and the cup is thereby lowered completely over the cap. With the cap held in the cup by the vacuum, the spindle is raised up from the shelf and then lowered over the end of the bottle which is in the pocket below the spindle.

The threads in the cap strike the threads on the bottle in the beginning of the dwell 118, and the vacuum cup is pressed up lightly into the holder and the pins 102 cammed inwardly to engage the bottle cap. Then, since the spindle is constantly rotated, the cap is thereby rotated until the threads engage, and the cap is allowed to thread down on to the bottle.

At the end of the dwell 118, the spindle is moved all the way down to the dwell position 120. In this position the spindle is pressed down forcibly against the action of the spring 60, the pins driven tightly against the cap, and the cap is screwed firmly in position.

The vacuum is then released and the spindle raised, restoring the vacuum cup to the hanging position, and releasing the pins.

In this manner a very dependable means is provided for picking the cap off from the shelf. The cap is positioned squarely and positively located by the cap flange C'. This ensures quick engagement of the threads, at least within one revolution of the cap on the bottle end; and the contact of the end of the vacuum chuck with said flange provides a good seal for maintaining the vacuum.

Having thus described my invention, I claim:

1. The combination with a machine of the class described of a rotatably mounted spindle, a vacuum cup for receiving and holding a cap snugly therein, the cup being mounted at the end of the spindle so as to have a limited amount of axial movement with respect thereto and connected therewith for rotation, means for producing a vacuum in the cup, radially disposed pins projecting through and slidable in the walls of the cup for engaging the cap, a ring mounted on the spindle concentric with and surrounding the cup, the ring having a cam surface adapted to engage and move the pins into engagement with the cap when the cup is moved axially on the spindle.

2. In a screw capping machine, a rotatable spindle, a vacuum cup adapted to snugly receive and hold a cap therein, the cup being mounted at the end of the spindle so as to have a limited amount of axial movement with respect thereto and connected therewith for rotation, means for producing a vacuum in the cup, clamping elements movably mounted in the cup, and means associated with the spindle for applying the clamping elements to the cap at one limit of said axial movement of the cup.

3. In a screw capping machine, a rotatable spindle, a vacuum cup adapted to snugly receive and hold a cap therein, the cup being mounted at the end of the spindle so as to have a limited amount of axial movement with respect thereto and being connected therewith for rotation, means for producing a vacuum in the cup, pins slidably mounted in and projecting through the wall of the cup, the pins being in engageable relation with the cap for holding same in non-rotatable relation in the cup, and camming means mounted on the spindle in a position to engage and move the pins into engagement with the cap when the cup is moved axially on the spindle.

4. In combination, a spindle, a vacuum cup slidably mounted on the spindle, means for producing a vacuum in the cup, radially disposed pins for engaging the cap projecting through the wall portions of the cup, a cam ring mounted on the spindle and encircling the cup so as to engage and press the pins inwardly when the cup is moved upwardly on the spindle.

Signed at Chicago, Illinois, this 8th day of August, 1931.

ARTHUR I. RISSER.